United States Patent [19]

Ferrieu et al.

[11] Patent Number: 4,484,034
[45] Date of Patent: Nov. 20, 1984

[54] ANTI-LARSEN-EFFECT ARRANGEMENT IN A TELEPHONE STATION EQUIPPED WITH A LOUDSPEAKER

[75] Inventors: Gilbert M. M. Ferrieu, Bievres; Roger B. J. Hamel, Clichy; Emmanuel Lefort, Montigny Le Bretonneux; Francoise Moliere, Paris, all of France

[73] Assignee: Telecommunications Radioelectrique et Telephoniques, Savarin, France

[21] Appl. No.: 500,799

[22] Filed: Jun. 7, 1983

Related U.S. Application Data

[63] Continuation of Ser. No. 258,088, Apr. 27, 1981.

[30] Foreign Application Priority Data

Apr. 25, 1980 [FR] France ............... 80 09411

[51] Int. Cl.³ ........................... H04M 9/08
[52] U.S. Cl. ................. 179/81 B; 179/170.8
[58] Field of Search ........... 179/81 A, 81 B, 90 A, 179/100 L, 170.2, 170.8; 381/71, 83, 93, 94, 120, 121

[56] References Cited

U.S. PATENT DOCUMENTS

| 3,963,876 | 6/1976 | Holtz et al. | 179/81 B |
|---|---|---|---|
| 4,051,325 | 9/1977 | Mafune et al. | 179/81 B |
| 4,119,797 | 10/1978 | Wollert | 179/1 HF X |
| 4,161,624 | 7/1979 | Brosow | 179/81 B |
| 4,310,831 | 1/1982 | Henderson et al. | 179/1 A X |

FOREIGN PATENT DOCUMENTS

| 56-117462 | 9/1981 | Japan | 179/81 B |
|---|---|---|---|
| 56-117463 | 9/1981 | Japan | 179/81 B |
| 589392 | 6/1977 | Switzerland | 179/285 |
| 568210 | 8/1977 | U.S.S.R. | 179/1 FS |

OTHER PUBLICATIONS

*Review of the Electrical Communication Laboratories,* vol. 27, Nos. 5-6, May–Jun. 1979, pp. 347-367; "Model S-1P Loudspeaker Telephone Circuit Design", Kato et al.

*Primary Examiner*—Keith E. George
*Attorney, Agent, or Firm*—Thomas A. Briody; William J. Streeter

[57] ABSTRACT

An anti-Larsen circuit for a telephone station in which the listening channel comprises an automatic listening level control circuit, suitably of the type comprising a variable attenuator circuit, a pulse-width modulator and a threshold detector which supplies compression pulses. The transmission channel comprises a circuit for rendering the transmission channel operative or inoperative and also a control circuit. Actuation takes place above a sound-level threshold $S_1$ and a de-activation below a sound-level threshold $S_2$ which is smaller than $S_1$.

9 Claims, 6 Drawing Figures

ANTI-LARSEN-EFFECT ARRANGEMENT IN A TELEPHONE STATION EQUIPPED WITH A LOUDSPEAKER

This a continuation of application Ser. No. 258,088, filed Apr. 27, 1981.

The invention relates to an anti-Larsen-effect circuit arrangement in a telephone station equipped with a loudspeaker. More specifically, the invention relates to a telephone station whose user, hereinafter referred to as the user I, during transmission preferably speaks close to the microphone, the microphone being physically separable from the set which comprises the loudspeaker and is connected to said loudspeaker by an electric lead. The microphone may form part of a handset. In the last-mentioned case the receiver is disposed in a shunt circuit of the listening channel, just after the first means for automatic listening-level control.

In this situation, regardless of the mode of operation of the telephone station, it is assumed hereinafter that when the user II, who is located at the other end of the speech line, is speaking, his voice is reproduced by the loudspeaker with such volume of sound that, after propagation through the air, said sound volume is picked up by the microphone with a level lower than level of speech of user I.

BACKGROUND OF THE INVENTION

The invention more in particular relates to an anti-Larsen-effect arrangement in which a first means for automatic listening-level control, in addition to a variable attenuator circuit for the received speech signal, comprises a pulse-width modulator which supplies a signal comprising pulses which are pulse-width modulated by the speech signal supplied by the variable attenuator circuit, a threshold detector which, in response to the signal supplied by the modulator, supplies a compression pulse each time that it detects that the amplitude of the modulating speech signal reaches a certain threshold, said compression pulses being applied to said attenuator circuit for contolling the charge of an integrator circuit which supplies the attenuation control signal. Such first means for automatic listening-level control are described in the U.S. patent application No. 244,359, filed Mar. 16, 1981.

The invention also applies to a so-called "free-hands" telephone, provided that the sound decoupling between the microphone and the loudspeaker is sufficient to comply with the assumption mentioned in the preceding paragraph. This sound-level priority condition in favour of the user I for sound signals injected into the microphone is easier to comply with when the listening channel comprises said first means for automatic listening-level control. This ensures that regardless of the spread in levels of the signals received from the user II, which signal specifically comprises the frequency behaviour of the line, the sound level emitted by the loudspeaker is substantially constant, said level being moreover manually adjustable. Such automatic listening-level control means are known, for example from the publication: Review of the Electrical Communication Laboratories, Volume 27, numbers 5, 6, May-June 1979, pages 347-367 in the article: Model S-1P Loudspeaker Telephone Circuit Design, by K. KATO et al.

In a telephone station in general, especially in a telephone station as described in the opening paragraph, it is substantially impossible to avoid that the transmit signal is not transferred to the listening channel via the duplexer (for example, differential or hybrid transformer). This results in acoustic feedback, which may give rise to oscillations, also called the Larsen effect, in the case that the loop gain is greater than 1 at a voice frequency which corresponds to the phase condition for instability. In the situation specified in the foregoing the Larsen effect in principle does not occur when the user I or the user II (or both) are speaking, because in that case the first means for automatic listening-level control receive a speech signal and automatically attenuate said signal in such a way that the loop gain becomes smaller than 1 in most cases.

On the contrary, the problem of the Larsen effect occurs when the speech signal (signals) is (are) absent or very weak. If no measures are taken to mitigate the Larsen effect, oscillations are produced, in the last-mentioned case, even in the absence of any audible noise, because the automatic listening-level control means, which only provide an attenuation, then have a gain equal to 1, and the preset gains $G_e$ and $G_r$ of the two amplifiers of the loop (transmission and listening) are such that, despite the attenuation via the duplexer and in the air, the loop gain is greater than 1. The parasitic oscillation can therefore start and as soon as its level at the input of the first means for listening-level control exceeds a certain predetermined voltage threshold of the order of 10 mV, said means begin to influence the amplitude of the parasitic oscillation and the Larsen effect may persist, the Larsen sound-level at the output of the loudspeaker being limited to said substantially constant level selected for listening. Said limitation of the Larsen sound-level implies that the two amplifiers of the loop are not saturated and the parasitic oscillation thus produced has a substantially sinusoidal waveform. However, if the amplifiers would be saturated, which is frequently the case when the Larsen effect occurs, the waveform obtained would differ enough from a sine wave, in which case the amplifiers would no longer operate in their linear range.

When said first means for automatic listening-level control, in addition to a circuit of a known type providing a variable attenuation of the received signal, suitably comprise a pulse-width modulator and a threshold detector as described in the foregoing, and the transmission channel is connected to a second control input of the variable attenuator circuit, it is found that the Larsen effect manifests itself as a train of speech signals of limited amplitude having a frequency of the order of Hertz and such that the sound level at the output of the loudspeaker disappears substantially between two adjacent sound signals, said train giving rise to a relaxation-oscillation effect.

The object of most of known anti-Larsen arrangements is to prevent a build-up of the Larsen effect, regardless of the relative positions of the loudspeaker and of the microphone, while the transmission channel and the listening channel are never disconnected. This is obtained by respectively taking the signal from the transmission channel and from the listening channel, applying said signals to a comparator or a decision circuit, whose output controls one or a plurality of attenuators, or the amplifiers disposed in the transmission channel and or the listening channel in such a way that for all possible speech conditions to be anticipated during communication the loop gain is maintained below 1. These arrangements have the drawback that they cause considerable variations of the levels of the transmitted or received speech signal.

SUMMARY OF THE INVENTION

The drawbacks of the prior art are mitigated in that, according to the invention, the anti-Larsen-effect arrangement defined in the opening paragraph is characterized in that said first means for automatic listening-level control comprise a variable attenuator circuit, a pulse-width modulator and a threshold detector, that the transmission channel moreover comprises second means for either in an unobtrusive manner substantially reducing or maintaining the level of the signal supplied by the microphone, and a control chain for said second means, which chain receives the output signal of the microphone and influences said second means either so as to maintain the level of the transmit signal when the sound signal received by the microphone has exceeded a first sound-level threshold $S_1$ or so as to reduce the level of the transmit signal when the level of the sound signal received by the microphone is too weak, the sound signal caused by the remote user at the input of the microphone being assumed to be smaller than $S_1$ and the sound signal caused by the local user being assumed to be within a range comprising the threshold $S_1$, and that during the time in which said chain acts so as to maintain the level of the transmit signal it also influences said first means for automatic listening-level control by actuating said attenuator circuit so as to obtain a predetermined attenuation, by introducing an additional compression signal $S_o$.

The expression: "in an unobtrusive manner substantially reducing the level of the transmitted signal" is to be understood to mean a reduction or turnoff operation which in one embodiment of the invention may even be the cut-off of the transmission channel. In this case the expression: "maintaining the level of the transmit signal" is to be understood to mean restoring or actuating the transmission channel upon cut-off. It is to be noted that even in the last-mentioned case this does not involve switching the speech to the one or the other direction of communication, as is for example the case in an intercom system. Indeed, in accordance with the invention, the users I and II may speak at the same time without any noticeable effect owing to an undesired variation of the sound levels received. On the other hand, the Larsen effect may still arise in the absence of speech, but said Larsen effect is immediately suppressed in an effective manner, as will be seen hereinafter.

In a preferred embodiment of the invention the anti-Larsen-effect arrangement defined in the second paragraph of the present description is characterized in that said control chain influences said second means either so as to maintain the level of the transmit signal when the sound signal received by the microphone has exceeded a first sound-level threshold $S_1$ and subsequently remains at a level higher than a second sound-level threshold $S_2$ which is below or equal to $S_1$, or so as to reduce the level of the transmit signal when the sound level received by the microphone has decreased below the threshold $S_2$ for a predetermined time, the sound signal caused by the local user being assumed to be situated in a sound-level range above the threshold $S_2$.

In this embodiment use is made of the fact that the Larsen effect may present itself in the form of a train of sound signals, the sound level being very low between two adjacent sound signals, which just after the appearance of the first sound signal of the train of Larsen signals allows said chain to substantially cut off the transmission channel via said second means.

BRIEF DESCRIPTION OF THE DRAWINGS

The following description with reference to the accompanying drawings, given by way of example, will enable the invention to be more fully understood.

In the Figures elements with similar functions bear the same reference.

DETAILED DESCRIPTION OF THE PREFERRED EMBODIMENTS

Figure 1:
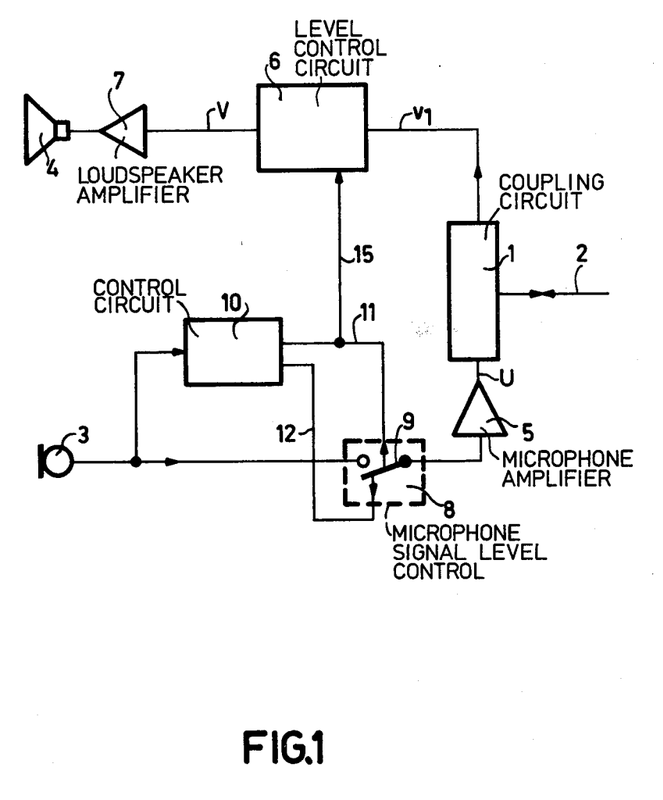
FIG. 1 is a simplified block diagram of the anti-Larsen-effect arrangement in accordance with the invention.

In FIG. 1, which shows the block diagram of a telephone station equipped with an anti-Larsen arrangement in accordance with the invention, the coupling circuit 1, also called hybrid circuit, couples the telephone line 2 to the transmission channel of the station provided with the microphone 3 and to the listening channel of the station provided with the loudspeaker 4. The transmission channel is provided with a microphone amplifier 5 having a gain $G_e$, which is preferably fixed, and between the hybrid junction and the loudspeaker the listening channel comprises first means 6 for automatic listening-level control, which means supply a signal, which is representative of the speech signal and is maintained at a fixed level, to the loudspeaker amplifier 7. The amplifier 7 has a variable gain $G_r$, which is adjusted by the user so as to obtain a convenient listening level, which is substantially independent of the level of the signal received owing to the level control circuit 6. The level control circuit 6 is suitably a level control circuit of the type described hereinafter with reference to FIG. 2 and bearing the reference 601 hereinafter. The transmission channel moreover comprises second means 8 for either in an unobtrusive manner, substantially reducing or maintaining the level of the signal supplied by the microphone 3.

In FIG. 1 said second means are schematically represented by a switch 9. In practice, the switch 9 is preferably a transistor operated in an on-off mode. Suitably, said transistor comprises a collector resistor arranged in series between the output of the microphone and the collector of this transistor. A chain 10, which receives the output signal of the microphone, controls the second means 9 so as to maintain the level of the transmit signal when the sound signal picked up by the microphone has exceeded a first sound-level threshold $S_1$ and subsequently remains at a level higher than a second sound-level threshold $S_1$ which is below or equal to $S_1$, which is indicated by line 11, or so as to reduce the level of the transmit signal when the level of the sound signal picked up by the microphone has decreased below the threshold S₂ for a predetermined time, which is indicated by the line 12. On the other hand, when line 11 is activated, a conductor 15 influences the level control circuit 6 by actuating the variable attenuator circuit of the latter so as to obtain a predetermined attenuation.

Figure 2:
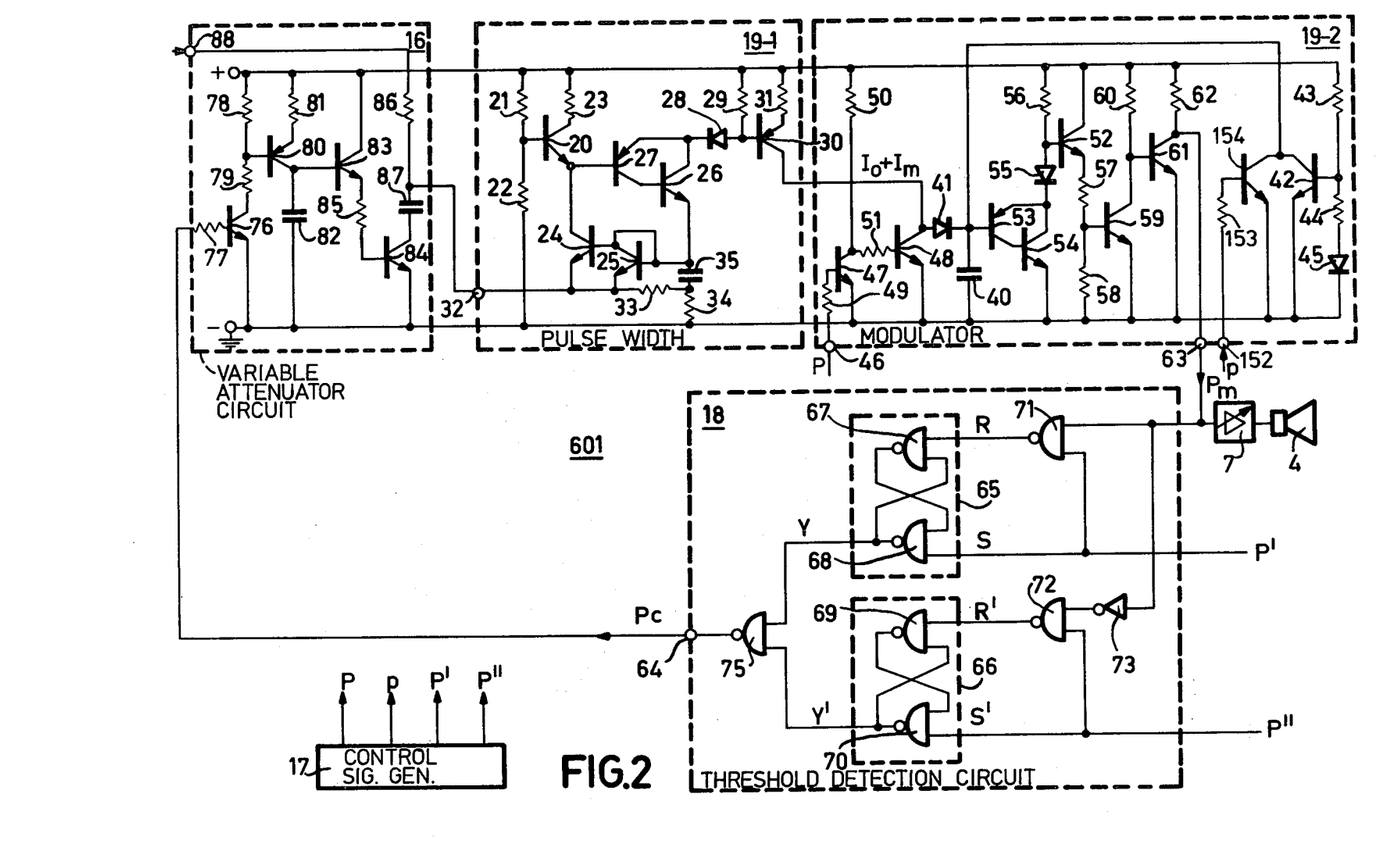
FIG. 2 is a detailed circuit diagram of the first means for automatic listening-level control comprising a variable attenuator circuit, a pulse-width modulator and a threshold detector circuit.

FIG. 2 shows the detailed circuit diagram of a level control circuit 601, whose operation is described in more detail in U.S. patent application No. 244,359, filed Mar. 16, 1981.

The level control circuit 601 comprises a pulse width modulator 19. Said modulator 19 comprises a first part 19-1, in which the sum current $I_o + I_m$ is formed, $I_o$ being a direct current of constant amplitude and $I_m$ being a current corresponding to the voice signal received, attenuated by the variable attenuator circuit 16. In the second part 19-2 pulses are formed which are pulse-width modulated by the sum signal $I_o + I_m$, constituting the modulated signal $P_m$.

The first part 19-1 of the modulator comprises a npn-transistor 20, whose base is biassed by the bridge of resistors 21 and 22, which transistor has a collector resistor 23 and feeds a fixed direct current $i_o$ to the input of a current mirror constituted by the npn-transistors 24 and 25, which are arranged as shown in the Figure. If the current mirror is designed so as to obtain a current ratio of 1 (identical transistors 24 and 25), the direct current $i_o$ will appear on the output of the current mirror 24, 25, which output is constituted by the bases of the transistors 24 and 25 which are connected to the collector of the transistor 25. The direct current $i_o$ flows through the collector-emitter path of the npn-transistor 26, which is conductive, the diode 28 and the resistor 29. It is to be noted that the transistor 26 and the npn-transistor 27 are connected in Darlington arrangement, so as to form a composite transistor which can be controlled by a very small current, which is the base current of the transistor 27, derived from the collector current of the transistor 20. The direct voltage across the resistor 29 produced by the direct current $i_o$, determines a direct current $I_o$ in the collector of the pnp-transistor 30.

Between the input terminal 32 of the modulator 19 and the negative power-supply terminal a variable voltage is applied which corresponds to the voice signal and which is processed in the variable attenuator circuit 16, as will be explained hereinafter. The terminal 32 is connected to the emitters of the transistors 24 and 25 which form a current mirror and to one end of the bridge of resistors 33 and 34, the other end of said bridge being connected to the negative power-supply terminal. The variable voltage across the resistor 34 is applied to the emitter of the transistor 26 via the capacitor 35 and produces a variable current $i_m$ in the collector-emitter path of said last-mentioned transistor, which current is added to the direct current $i_o$. Ultimately, this results in a variable current $I_m$ in the collector of the transistor 30, which current is added to the direct current $I_o$. In the sum current $I_o + I_m$ thus formed the variable current $I_m$ corresponds to the speech signal.

In the second part 19-2 of the modulator said sum current $I_o + I_m$ is employed to charge the capacitor 40 via the diode 41, thereby permanently feeding a discharge direct current $I_d$ from said capacitor into the collector of the npn-transistor 42, whose base is biassed by the bridge constituted by the resistor 43, 44 and the diode 45. The charging current of the capacitor 40 is therefore $I_c = I_o + I_m - I_d$ and said charge is built up during the positive pulses of the signal P which, via the terminal 46 of the modulator, is applied from the control circuit 17 to the two cascaded npn-transistors 47 and 48 with the usual resistors 49, 50 and 51. It will be appreciated that during the positive pulses of the signal P transistor 47 is bottomed, transistor 48 is cut-off and capacitor 40 is charged by the current $I_c = I_o + I_m - I_d$. During the intervals between the positive pulses of the signal P transistor 47 is cut off, transistor 48 is bottomed, and capacitor 40 is discharged by the direct current $I_d$. Finally, capacitor 40 can rapidly and fully be discharged during the positive pulses of the signal p, which pulses are applied to the base of the npn-transistor 54 via the terminal 52 and the resistor 53 in order to bottom said last-mentioned transistor.

The control signals P and p are generated in the control-signal generator 17. The pulses of the signal p appear just before those of the signal P. Thus pulse-width modulated pulses derived from the voltage across the capacitor 40, as will be explained hereinafter.

In the circuit diagram of FIG. 2, it will be seen that the voltage on the capacitor 40 also appears on the emitter of the npn-transistor 52 via the composite transistor formed by the interconnected pnp-transistor 53 and npn-transistor 54 and the diode 55 and the resistor 56, as shown in the Figure. Said voltage on the emitter of the transistor 52 is applied to the voltage-divider bridge formed by resistors 57 and 58. The central tapping of said bridge is connected to the base of the npn-transistor 59 and the ratio of the values of the resistors 57 and 58 is selected so that transistor 59 is turned on when the voltage across the capacitor 40 is higher than a predetermined threshold voltage $V_s$ and is cut off in the other case. The collector of the transistor 59 is provided with a resistor 60 and is connected to the base of the npn-transistor 61, whose function is exactly the inverse of that of the transistor 59. Thus, on the collector of the transistor 61, which provided with a resistor 62 and connected to the output terminal 63 of the modulator 19, a modulated signal $P_m$ is obtained, which signal is positive when the voltage of the capacitor 40 is higher than the threshold voltage $V_s$ and which is zero in the opposite case. The position of the falling edge of the signal $P_m$ relative to the position of said edge for $I_m = 0$ indicates the sign and amplitude of the variable current $I_m$ during the brief pulses of the control signal P. Suitably, the threshold voltage $V_s$ is just equal to the voltage $V_{c2}$ obtained on the capacitor 40 at the end of a pulse of the signal P, for the extreme negative value $-I_{m1}$ of the variable current $I_m$. It is also advantageous that for the extreme positive value $I_{m1}$ of the variable current $I_m$ the decreasing voltage via the capacitor 40 reaches the value of the threshold voltage $V_s$ at the very instant at which a pulse of the signal p appears, which restores the voltage across the capacitor 40 to zero. It is assumed that these conditions are met for the arrangement of FIG. 2.

It is evident that if for the entire range of values of the variable current $I_m$, between $-I_{m1}$ and $I_{m1}$, the falling edge of the signal $P_m$ is shifted by the maximum possible amount between the end of a pulse of the signal P and the beginning of a pulse of the signal p, and is a linear function of the variable current $I_m$. Here, it will be noted that the rising edge of the pulse of the signal $P_m$ is slightly shifted (within a pulse of the signal P) when the variable current $I_m$ varies from $-I_{m1}$ to $+I_{m1}$. This results in a spurious modulation of the width of the pulses of the signal $P_m$, which has no effect on the level control device, which only employs the falling edges of the pulses of the signal $P_m$ in order to detect whether the amplitude of the variable current $I_m$ is exceeded.

The modulated signal $P_m$ available on the terminal 63 of the modulator 19 is applied to the threshold detector circuit 18, which serves to provide a compression signal $P_c$ on its output 64, in which signal a compression pulse appears each time that it is detected that the positive or negative amplitude of the variable current $I_m$ reaches or exceeds a predetermined absolute threshold value. This detection is based on the position of the falling edge of the modulated signal $P_m$. For this purpose two pulse signals P' and P'' are used. The pulses of the signals P' and P'' are situated near the two ends of the range between which the falling edge of the modulated signal $P_m$ can be shifted. The threshold detector 18 supplies a compression pulse when said falling edge reaches or exceeds the positions of the pulses P' or P''.

In the embodiment shown in FIG. 2 said threshold detection circuit 18 comprises two RS flip-flops 65 and 66 formed in the customary manner by means of NAND-gates 67, 68 and 69, 70. The output of the NAND-gate 71, which receives the signal $P_m$ and P' is connected to the R-input of the flip-flop 65; the signal P' is applied to the S-input of said flip-flop 65. The R'-input of the flip-flop 66 is connected to the output of the NAND-gate 72, which receives the signal P'' and the signal $\overline{P_m}$, which is the inverse of $P_m$ and which is formed by means of the inverter circuit 73; the signal P'' is applied to the S'-input of said flip-flop 66. The Y and Y'-outputs of the two flip-flops are connected to the two inputs of the NAND-gates 75, whose output is connected to the output 64 of the threshold detection circuit 18 for supplying the compression signal $P_c$.

The falling edges of the modulated signal $P_m$ may occur during the pulses of the signal P''. In that case the signal Y on the output of the flip-flop 65 is the complement of the signal P', the signal Y' on the output of the flip-flop 66 is "1" and in the signal $P_c$ supplied by the NAND-gate 75 a compression pulse appears which coincides with the pulse of the signal P'.

The falling edges of the modulated signal $P_m$ may also appear before the pulses of the signal P''. In that case the signal Y remains "1", the signal Y' is the complement of the signal P'' and in the signal $P_c$ a compression pulse appears which coincides with the pulse of the signal P''.

In the circuit 16 the compression signal $P_c$ is applied to the base of the npn-transistor 76 which has a base resistor 77 and series-connected collector resistors 78 and 79. The pnp-transistor 80 has its base connected between the resistors 78 and 79. It comprises an emitter resistor 81 and its collector is connected to the capacitor 82. Each of the compression pulses of the signal $P_c$, which indicate that the amplitude of the variable current $I_m$ corresponding to the speech signal is exceeded, serves to charge the capacitor 82. The voltage on the capacitor 82 serves to control the current through the npn-transistor 83, whose emitter current is applied to the base of the npn-transistor 84 via the resistor 85. The transistors 83 and 84 become more conductive as the capacitor 82 is charged and then presents a continually decreasing impedance to the speech signal, which is received from the input terminal 88 of the attenuator circuit and which is applied to the collector of the transistor 84 via the resistor 86 and the coupling capacitor 87. The speech signal available between the resistor 86 and the capacitor 87 is thus corrected so as to obtain an attenuation when the circuit 18 detects that the amplitude is exceeded. This signal is applied to the input 32 of the pulse-width modulator 19.

It is to be noted that during the compression pulses the capacitor 82 is charged by a comparatively large current, the collector current of the transistor 80, and is discharged by a small current, the base current of the transistor 83, which is suitably a composite transistor. As a result of this, the voltage on the capacitor 82 rapidly follows the excess amplitude of the speech signal during the onset of syllables and follows amplitude decreases with a certain delay. Finally, the voltage across the capacitor 82 is stabilised about a mean value which defines a substantially constant level for the speech value.

The operation of the generator 17 for the control signals P, P', P'', p will be obvious to those skilled in the art and will not be described in more detail. The signal P should be formed by pulses of short duration; its frequency should be relatively high with respect to the maximum frequency of the speech signal. The frequency of the pulses of the signal P may for example be 20 kHz and the duration of each pulse may be equal to 1/20 of one period of the 20 kHz. The pulses in the other signals p, P', P'' have the same frequency and the same duration and are shifted relative to the signal P.

The loudspeaker 4 is suitably driven by the modulated signal $P_m$, which leads to a simplified loudspeaker amplifier 7. The amplifier may be of class D, that is, one having a high efficiency. In this amplifier the modulated signal $P_m$ is first processed in order to eliminate the spurious modulation which, as already stated, is due to the fact that the rising edge of the signal $P_m$ does not have a strictly fixed position. In principle, it may be constituted by four transistors arranged as a double push-pull follower amplifier, whose load is constituted by the loudspeaker 4. Said loudspeaker functions as a low-pass filter and is sensitive to substantially only the modulation contained in the signal $P_m$ (which is exempt of spurious modulation), that is to the speech signal, and is immune to components of high frequency (20 kHz and harmonics thereof) contained in the signal $P_m$. The speech signal supplied by the loudspeaker 4 can be adjusted by varying the bias voltage on the base of a power-supply transistor of the four transistors constituting the double push-pull follower amplifier.

If, preferably, such a level control circuit 601 is employed, while the transmission channel is open, and said channel influences the charge of the capacitor 82 as described hereinafter, it will be found that the Larsen effect is produced in the absence of speech, but without the listening amplifier 7 being bottomed, and moreover, that said effect is vanishing, that is it decreases until a substantially inaudible sound level is reached and subsequently is started again with a frequency of the order of Hertz. This is especially so in the case of small distances between the loudspeaker and the microphone and/or when these elements face each other, that is when the loop gain definitely exceeds 1 in the absence of a sound signal. In this situation the first control chain, described hereinafter with reference to FIG. 3, can cut off the transmission channel just after the first Larsen oscillation and thus suppress the Larsen effect as soon as it arises. In order to enable the level control circuit 601 to respond rapidly so as to reduce the loop gain, which promotes the vanishing Larsen effect, the control chain influences the variable attenuator circuit 16 so as to obtain a predetermined attenuation, while, simultaneously ensuring that the transmission level is maintained. This is achieved by the preferred embodiment of the invention described hereinafter with reference to FIG. 3.

Figure 3:
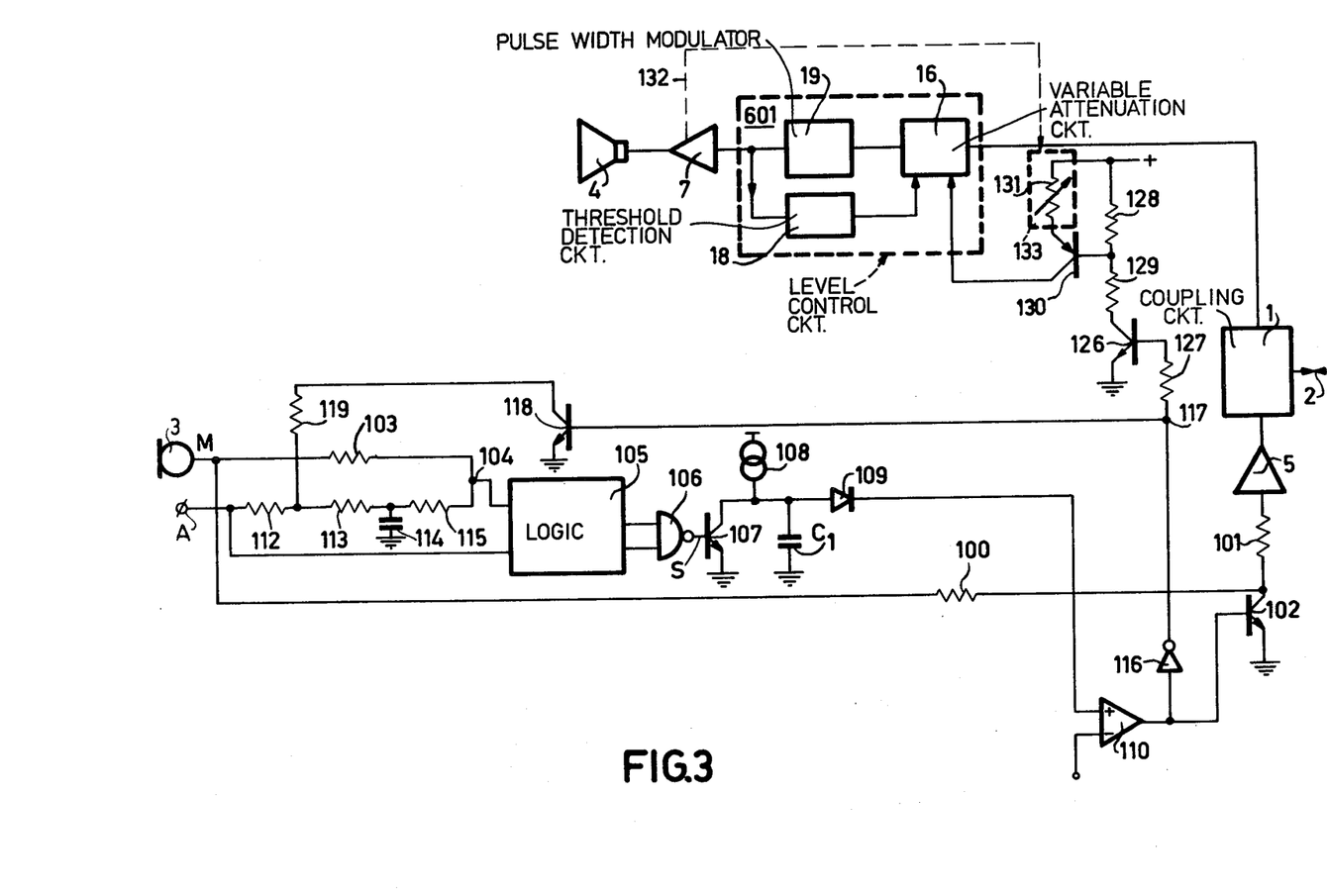
FIG. 3 is a block diagram of the preferred embodiment of the arrangement in accordance with the invention.

In FIG. 3 the output signal of the microphone, referenced M, is applied to the transmission amplifier 5 via the series-connected resistors 100 and 101 and, in parallel, it is applied to earth, via the resistor 100 and the collector-emitter path of the npn-transistor 102, which corresponds to the element 8 in FIG. 1 (second means). When transistor 102 is bottomed, the transmission channel is substantially cut off and when said transistor is cut off the transmission channel is open. The base bias of transistor 102 is controlled by a circuit connected to the microphone output and formed by a resistor 103, a tapping 104, a logic element 105, NAND-gate circuit 106 which supplies a signal S to the base of an npn-transistor 107, whose collector is connected to a current source 108 and whose emitter is connected to earth, a capacitor $C_1$ connected between the current source 108 and earth, a diode 109, and the positive input (non inverting) of a differential amplifier 110, which receives a constant voltage level on its negative input (inverting) and whose output is connected to the base of transistor 102. An auxiliary signal A is supplied directly to a second input of the element 105 and via the resistors 112, 113, a capacitor 114, which is shunted to earth, and a resistor 115 to the tapping 104. On the other hand, the output of the differential amplifier is connected to the point which is common to the resistor 112 and 113 via an inverter 116, the tapping 117, the base-collector path of an npn-transistor 118 and a resistor 119.

The operation of the first control chain is explained hereinafter with reference to FIGS. 4 and 5.

Figure 4:
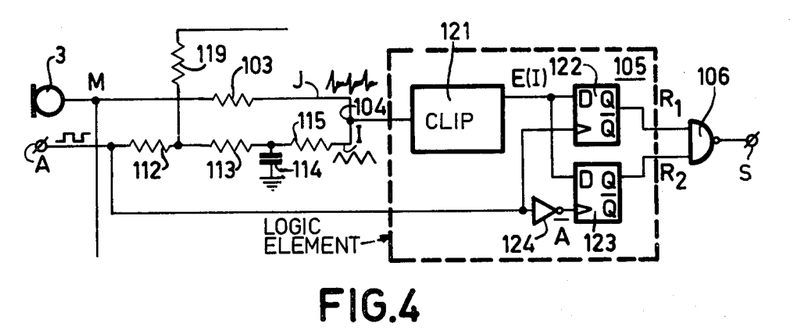
FIG. 4 is a block diagram of a part of the control chain of said second means.

FIG. 4 shows the element 105 in detail, which element is constituted by a clipper 121 and two D-flip-flops 122 and 123. The clipper input is connected to point 104 and its output supplies a signal E to the input of the flip-flops 122 and 123. The auxiliary signal A is directly supplied to the clock input of the flip-flop 122 and via an inverter 124 to the clock input of the flip-flop 123. The inputs of the NAND-gate circuit 106 are respectively connected to the $\overline{Q}$-output of the flip-flop 122 and to the Q-output of the flip-flop 123. The resistors 103, 112, 115, 119 provide impedance matching of the various circuits.

Figure 5:
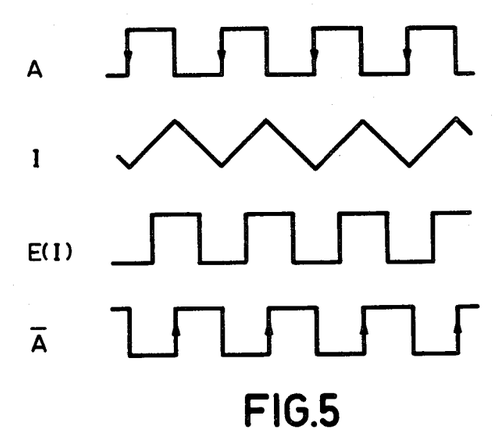
FIG. 5 is a time diagram of certain signals in the control chain.

The signal A, shown in FIG. 5, is a squarewave signal. After integration by the RC-circuit 113, 114 a triangular signal I, which is shifted by $\pi/2$ relative to the signal A, on the output of resistor 115. At 104, either the signal I or the signal J, derived from the speech signal M preponderates, depending on their respective amplitudes. It is assumed that at a first instant the signal I, from A, is dominant. After clipping at 121, the signal E(I), shown in FIG. 5, is obtained, which is a squarewave signal that is in phase with the signal I, that is, having a delay of $\pi/2$ relative to the signal A. When the arrangement of the flip-flops 122 and 123 is known, it is evident that the $\overline{Q}$-output of 122 supplies a logic signal $R_1=1$ and that the Q-output of 123 supplies a logic signal $R_2=1$. Consequently, the S-output of circuit 106 is at zero voltage, transistor 107 (FIG. 3) is cut off and the current source 108 charges the capacitor $C_1$. Above a predetermined charge of $C_1$ the diode 109 is turned on, the output of the differential amplifier 110 is maintained at a positive direct voltage and transistor 102 is bottomed, that is the transmission is substantially cut-off. It is to be noted that in this situation, which corresponds to a weak or no sound input to the microphone 3, point 117 is zero volts owing to the inverter circuit 116, transistor 118 is cut off and no current flows through the resistor 119.

Starting from the situation described in the foregoing, the sound level received by the microphone increases when said level exceeds a threshold $S_1$ of a predetermined value, the signal J (see FIG. 4) preponderates over the signal I, and the output signal E of the clipper 121 exhibits rising and falling edges which are randomly distributed in time. As a result of this, logic zeros appear on the input $R_1$ and/or the input $R_2$ of the NAND-gate 106, which each time result in an "1" on the S-output of 106, that is transistor 107 is bottomed and capacitor $C_1$ discharges rapidly via the collector-emitter path of the transistor 107. Diode 109 is no longer conductive, the negative input of the differential amplifier 110, which is at a fixed voltage, becomes preponderant and the output of said amplifier becomes negative, as a result of which transistor 102 is cut off and transistor 118 is turned on. Since transistor 102 is cut off, the transmission channel is open and at the same time transistor 118 is bottomed, a current flows through resistor 119. The auxiliary signal A is thus attenuated, because a part of this signal is drained via the collector-emitter path of the transistor 118, while the sound input to the microphone remains below the threshold $S_1$, the signal J remaining preponderant over the signal I. This produces a hysteresis, which situation is maintained until the sound signal decreases below a second predetermined threshold $S_2$, which is lower than $S_1$.

In practice, when the transmission channel is cut off, it suffices that the user I speaks normally to re-open the transmission channel. This is effected very rapidly in a few milliseconds, in response to the onset of the first syllable of each word. Thus, this does not lead to any inconvenience for the user II.

The hysteresis obtained by means of the sound level thresholds $S_1$ and $S_2$ enables the transmission channel to be maintained open despite an irregularity in sound level between the syllables and the words from the user I. The amplitude range of the transmitted sound exceeds the threshold $S_2$ and contains the threshold $S_1$. On the other hand, when the user I and/or the user II speak(s), the listening level control circuit 601 operates to attenuate the signal which it receives in such a way that the loop gain is smaller than 1 in most cases and that the Larsen effect cannot occur. The Larsen effect can neither occur when the transmission channel is cut-off by the first control chain. The only instant at which the Larsen effect can occur is the very brief time in which the sound input to microphone ceases and the transmission channel is not yet cut off or when the microphone is subject to a very light shock which restores the transmission channel. As already stated, the Larsen effect which then appears is vanishing owing to inter alia the presence of the listening level control circuit 601 and, after its first appearance, the first control chain, in the absence of sound, cuts off the transmission channel and thereby prevents the Larsen effect, which otherwise would recur. In the present embodiment steps are taken to ensure that the Larsen effect appears in a vanishing form, regardless of the relative positions of the loudspeaker and the microphone over a range of short distances, or to ensure that it cannot occur by making the loop gain smaller than 1, when the loudspeaker and the microphone are relatively far from each other (in this last-mentioned case the spurious Larsen oscillation could occur and sustain itself with a substantially constant amplitude, because the sound level input to the microphone does not exceed the threshold $S_2$). The function described in the preceding sentence is symbolically represented by the connection 15 in FIG. 1 and in FIG. 3 by the chain which connects the tapping 117 to the variable attenuator circuit 16. Starting from point 117 said chain includes a resistor 127, the base-collector path of an npn-transistor 126, whose emitter is connected to earth, a resistor 129, the base-collector path of a pnp-transistor 130, whose emitter is connected to the positive power-supply terminal by a resistor 121 and whose collector is connected to the collector of the pnp-transistor 80 (see FIG. 2). The base of transistor 130 is connected to the positive power-supply terminal via a resistor 128. When point 117 is at a positive voltage (transmission channel open) the said chain charges capacitor 82 (FIG. 2). The signal in the form of pulses of a long duration on point 117 consequently operates in parallel with the signal $P_c$, which has the form of compression pulses of short duration. The components 126 to 131 are similar to the components 76 to 81, they are arranged in the same way and perform the same functions; however, the collector current of the transistor 130 should be set to a much smaller value than the collector current of the transistor 80. This is achieved by means of the resistor 131. Thus, a supplementary compression signal $S_o$ of predetermined value is obtained, which compression signal does not correspond to any sound signal or more precisely corresponds to the fictitious sound signal received by the microphone. Said signal $S_o$ is such that it is equivalent to the compression signal which would appear in the loop in the absence of the chain 126 to 131 if the microphone has received a sound signal of a specific level.

The introduction of the signal $S_o$ has the slight drawback that, when the user II speaks and when the level of the speech signal is very low at the input of the listening-level control circuit 601, the sound level output of the loudspeaker is smaller than the level which has been set to a fixed value by the control circuit 601, which does not receive said signal $S_o$. However, this difference is no longer noticeable when the level of the speech signal from the user II and/or the user I is normal or high and, furthermore, it is to be noted that during most of the time when only the speaker II is speaking, the transmission channel is normally cut off because the controlled sound produced by the loudspeaker presents a sound level below $S_1$ to the microphone.

As the switching times of the first control chain and of the chain 126 to 131 are very fast owing to the very short actuation (restoration) time of the transmission channel, the introduction of the signal $S_o$ in no way disturbs the transitional modes of the listening channel, which are voluntarily selected to be longer than the duration of one syllable. On the other hand, the time constant for rendering the transmission channel inoperative is of the order of 100 ms, although when the compression signal $S_o$ disappears the attenuation produced in the listening channel does not disappear with said time constant of approximately 100 ms, but with the slightly longer syllabic time constant of the listening channel. This means that, in accordance with the invention, it is possible to render the transmission channel operative and inoperative without influencing the speed with which the listening level is reduced relative to the predetermined constant level or the speed with which said constant level is restored. Thus, the presence of the signal $S_o$ does not affect the listening comfort with respect to transitional modes owing to the appearance or disappearance of the signal $S_o$.

The operation of the anti-Larsen-effect arrangement is explained with reference to FIG. 1, adopting the following assumptions and notations:

$\alpha$: attenuation factor of the hybrid junction 1;

$\beta$: acoustic attenuation factor between the loudspeaker 4 and the microphone 3, which depends on the relative distance and orientation of the elements 3 and 4;

$G_r P_o$: maximum mean acoustic pressure by the loudspeaker when the output voltage of the level control circuit 6 is a maximum;

$P_o$: maximum mean speech pressure at the location of the mouth of the user I;

$\beta_o$: acoustic attenuation factor between the mouth of the user I and the microphone;

$U_o$: mean maximum output voltage on the output of the transmission amplifier 5 when the user I is speaking;

$S_o$: attenuation factor introduced at 6 during closure of the transmission channel.

It will first be demonstrated that the transmission channel is open when the user II speaks alone, the voltage U on the output of the amplifier 5 having the value:

$$U = U_o(\beta_o/\beta) \cdot G_r$$

Consequently, the voltage $v_1$ on the output of the hybrid 1 may be expressed by:

$$v_1 = (U/\alpha) = (U_o/\alpha) \cdot (\beta_o/\beta) \cdot G_r$$

After the supplementary compression $S_o$, the voltage $v_1$ changes to:

$$v = (v_1/S_o) = (U_o G_r \beta_o / \alpha\beta S_o)$$

The condition for instability, which gives rise to the Larsen effect, $v_o$ being the minimum input voltage of the control circuit 6 from which its output voltage V is equal to the maximum control value $V_o$ (see FIG. 6), is: $v > v_o$, that is:

$$(U_o G_r \beta_o / \alpha\beta S_o) \geq v_o \qquad (1)$$

Requirement (1) may be written as follows, when $G_o$ is the initial slope of the curve representing the gain of the control circuit 6 in the absence of the compression signal $S_o (G_o = (V_o/v_o)$:

$$(U_o G_r \beta_o / \alpha\beta S_o) \geq (V_o/G_o) \text{ or:}$$

$$(G_o/S_o) \geq \alpha(\beta/\beta_o) \cdot (1/G_r)(V_o/U_o) \qquad (2)$$

$V_o$ and $U_o$ are constants which depend on the specific circuit and are of substantially the same order of magnitude, for example 3 V peak to peak. The non-oscillation requirement derived from condition (2), after simplification, is therefore:

$$(G_o/S_o) < \alpha(\beta\beta_o) \cdot (1/G_r) \qquad (3)$$

$(G_o/S_o)$ is the actual slope $(V/v_1)$ of the voltage V on the output of the control circuit 6 relative to the voltage $v_1$ on the input of the control circuit.

Figure 6:
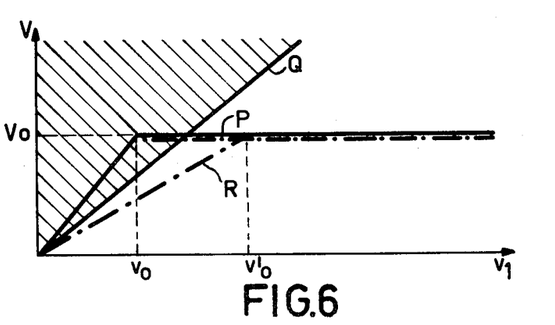
FIG. 6 is a voltage diagram in order to illustrate the operation of the anti-Larsen-effect arrangement in accordance with the invention.

In FIG. 6 the following three curves are plotted:

P: characteristic of the control circuit 6 (of type 601) in the absence of the supplementary compression signal $S_o$;

Q: straight line having a slope $\alpha(\beta/\beta_o)\cdot(1/G_r)$ passing through the origin;

R: characteristic of the control circuit 6 (of type 601) when the supplementary compression signal $S_o$ is present.

The hatched part of FIG. 6 is a range of instability for the part of the characteristic of the control circuit located at this part.

FIG. 6 shows that when the signal from the telephone line 2, on the output of the hybrid 1, is greater than: $v'_o = S_o v_o$, said signal level will be audible at the loudspeaker with the maximum output level $G_r P_o$.

It is to be noted that the compression effect of the signal $S_o$ should neither be selected to be too strong or too weak, but should lie in a range of mean values such that at the given gain values $G_e$ and $G_r$ of the amplifiers 5 and 7, for a first range of short distances between the loudspeaker and the microphone, the said vanishing Larsen effect is obtained and beyond said range a loop gain smaller than 1, that is, such that the Larsen effect cannot occur as is illustrated by FIG. 6. In the case in which the gain $G_r$ of the amplifier 7 is manually adjustable, it is possible, for certain sets of values selected for the parameters $G_r$ and $S_o$, to obtain a range of distances between the microphone and the loudspeaker which is situated between a range of short distances with a vanishing Larsen effect and a range of long distances with a loop gain smaller than 1, said range of intermediate distances being such that the loop gain is higher than 1, while the Larsen effect is not vanishing but continuous. For this range of intermediate distances the arrangement in accordance with the invention described in the foregoing would fail, because the Larsen effect could arise and be sustained at a constant sound level without saturating the loudspeaker. In order to preclude this drawback, a variant of the embodiment described in the foregoing controls the supplementary compression signal $S_o$ as a function of the value of the gain $G_r$, so as to reduce the effect of the signal $S_o$ on the listening channel when the gain $G_r$ is reduced (see condition 3 in the foregoing). In this way the range of intermediate distances given in the foregoing can be compressed, regardless of the value chosen for $G_r$. Suitably, the compression effect introduced by the signal $S_o$ is made proportional to the gain $G_r$. Controlling $S_o$ depending on $G_r$ can be achieved, for example as is represented by the broken lines in FIG. 3: a signal representative of the gain $G_r$ is applied from the listening amplifier 7 to an element 134 comprising the resistor 131, which may be variable, via a conductor. The value of the resistor 131 is controlled in known manner by the signal on the conductor 132, so that the collector current of the transistor 130 is varied and consequently the value of the compression signal $S_o$ in the desired sense and with the desired amplitude. In this situation, supposing for example that the ambient noise of the station is low, the listening gain may be reduced at 7 and the voice of a speaker whose speech signal would be weak at the output of the hybrid junction 1 is then attenuated to a smaller extent by the signal $S_o$ at the output of the loudspeaker 4. More precisely, the level of the threshold voltage $v'_o$ of the output signal of the hybrid junction 1 below which the influence of the signal $S_o$ is perceptible to the ear of the user I is thus further reduced. In a telephone station in which the gain $G_e$ of the transmission amplifier 5 is also variable, it may be advantageous to control the signal $S_o$ as a function of said gain $G_e$ and/or of the product of the gain factors $G_e$ and $G_r$, depending on certain operating conditions of the station.

What is claimed is:

1. An anti-Larsen-effect arrangement in a telephone station having a transmission channel and a listening channel, said listening channel comprising first means for automatic listening signal level control, a speaker amplifier whose gain is manually variable and a loudspeaker, said first means comprising a variable attenuation circuit for attenuating said listening signal in response to compression signals, a pulse width modulator connected between said variable attenuator circuit and said speaker amplifier for pulse width modulating said listening signal which is then amplified by said speaker amplifier and delivered to said loudspeaker, and a threshold detector responsive to the signal supplied by the pulse width modulator which produces a compression signal pulse each time that it detects that the amplitude of the signal received by said microphone reaches a certain threshold, said transmission channel comprising a microphone for supplying an output signal in response to a sound signal received by said microphone, second means connected to said microphone for selectively attenuating the level of the output signal of said microphone to provided a transmit signal, an amplifier having a generally fixed gain connected to said second means for amplifying the transmit signal, and a control chain for said second means, which chain receives the output signal from said microphone and controls said second means to attenuate the level of the transmit signal when the level of the sound signal received by said microphone is less than a sound level threshold $S_1$, the level of the sound signal received by said microphone from said loudspeaker and which is caused by a remote user being assumed to be lower than level threshold $S_1$ and the sound signal received by said microphone and produced by a local user being assumed to be within a range including level threshold $S_1$, and while said chain is selectively not controlling said second means to attenuate said transmit signal said chain provides an additional compression signal $S_O$ to said first means to control said variable attenuator circuit to obtain a predetermined attenuation of the listening signal.

2. An anti-Larsen-effect arrangement as claimed in claim 1 wherein said control chain controls said second means to selectively not attenuate the level of the transmit signal when the sound level received by the microphone has exceeded said first sound level threshold $S_1$ and subsequently remains at a level higher than a second sound-level threshold $S_2$, which is below or equal to $S_1$, and to selectively attenuate the level of the transmit signal when the level of the sound signal received by said microphone has decreased below the level threshold $S_2$ for a predetermined time, the sound signal received by said microphone and produced by the local user being assumed to be situated within a sound-level range above the level threshold $S_2$.

3. An anti-Larsen-effect arrangement as claimed in claim 2 wherein said control has a time constant for selectively not attenuating the transmit signal that is small relative to a time constant for controlling said first means to attenuate the listening signal and has a time constant for attenuating the transmit signal, which is of the order of 100 ms, and which is fast relative to a time constant for selectively not attenuating the listening signal.

4. An anti-Larsen-effect arrangement as claimed in claim 1 wherein said compression pulses from the threshold detector are applied to said variable attenuator circuit to control the charge of an intergrator circuit which supplies an attenuation control signal, said first means having time constants that are fast during actuation in order to follow the increase of a signal and slow during deactivation.

5. An anti-Larsen-effect arrangement as claimed in any one of the the claims 1 to 4 wherein said additional compression signal $S_O$ depends on the manually variable gain of the speaker amplifier so as to obtain a reduction of the effect of the signal $S_O$ on the attenuation of the listening signal when said manually variable gain decreases.

6. An anti-Larsen-effect arrangement as claimed in claim 5 wherein the effect produced by the signal $S_O$ is controlled to be proportional to said manually variable gain.

7. An anti-Larsen-effect arrangement as claimed in any one of the claims 1 to 4 wherein said control chain comprises, in cascade between the output of said microphone and a control input of said second means, a resistor, a tapping, a logic element, a NAND-gate circuit, an npn-transistor, whose collector is connected to a current source and whose emitter is connected to earth, a capacitor $C_1$, included between said current source and earth, a diode, and the positive input of a differential amplifier which receives a constant voltage level on its negative input, said tapping receiving an auxiliary signal, after integration, which signal can be rendered active and inactive by the output of said differential amplifier, said auxiliary signal being also applied directly to a second input of said logic element.

8. An anti-Larsen-effect arrangement as claimed in claim 7 wherein compression signal $S_O$ is provided by the output signal of said differential amplifier.

9. An anti-Larsen-effect arrangement as claimed in any one of the claims 1 to 4 wherein said second means in the transmission channel comprises an npn-transistor which is controlled on its base, whose collector is connected to the input of said transmission amplifier via a resistor, and whose emitter is connected to a negative power supply terminal (earth) and may be provided with a collector resistor.

* * * * *